(12) United States Patent
Vince et al.

(10) Patent No.: US 10,837,830 B2
(45) Date of Patent: Nov. 17, 2020

(54) SPECTRAL-SPATIAL IMAGING DEVICE

(71) Applicant: Regents of the University of Minnesota, Minneapolis, MN (US)

(72) Inventors: Robert Vince, Mendota Heights, MN (US); Swati Sudhakar More, Eagan, MN (US); James Melvin Beach, Auburn, AL (US)

(73) Assignee: Regents of the University of Minnesota, Minneapolis, MN (US)

( * ) Notice: Subject to any disclaimer, the term of this patent is extended or adjusted under 35 U.S.C. 154(b) by 114 days.

(21) Appl. No.: 16/081,806

(22) PCT Filed: May 10, 2017

(86) PCT No.: PCT/US2017/021787
§ 371 (c)(1),
(2) Date: Aug. 31, 2018

(87) PCT Pub. No.: WO2017/156400
PCT Pub. Date: Sep. 14, 2017

(65) Prior Publication Data
US 2019/0107439 A1  Apr. 11, 2019

Related U.S. Application Data

(60) Provisional application No. 62/306,520, filed on Mar. 10, 2016.

(51) Int. Cl.
*G01J 3/40* (2006.01)
*G01J 3/28* (2006.01)
*G01J 3/02* (2006.01)

(52) U.S. Cl.
CPC .............. *G01J 3/2803* (2013.01); *G01J 3/027* (2013.01); *G01J 3/0248* (2013.01)

(58) Field of Classification Search
CPC ........ G01J 3/28; G01J 3/40; G01J 3/02; G01J 3/08; G01J 3/42
(Continued)

(56) References Cited

U.S. PATENT DOCUMENTS 7,107,092 B2 9/2006 Goldstein et al.
7,653,428 B2 1/2010 Goldstein et al.
(Continued)

FOREIGN PATENT DOCUMENTS

CA 2928968 A1 5/2015
CA 2930112 A1 5/2015
(Continued)

OTHER PUBLICATIONS

International Search Report and Written Opinion of International Application No. PCT/US2017/021787, dated Jun. 20, 2017, 15 pp.
(Continued)

*Primary Examiner* — Md M Rahman
(74) *Attorney, Agent, or Firm* — Shumaker & Sieffert, P.A.

(57) ABSTRACT

In general, an imaging system to synchronously record a spatial image and a spectral image of a portion of the spatial image is described. In some examples, a beam splitter of the imaging system splits an optical beam, obtained from a viewing device, into a first split beam directed by the imaging system to a spatial camera and a second split beam directed by the imaging system to the entrance slit of an imaging spectrograph that is coupled to a spectral camera. An electronic apparatus synchronously triggers the spatial camera and the spectral camera to synchronously record a spatial image and a spectral image, respectively.

25 Claims, 16 Drawing Sheets

(58) Field of Classification Search
USPC .......................................................... 356/303
See application file for complete search history.

(56) References Cited

U.S. PATENT DOCUMENTS

| | | | |
|---|---|---|---|
| 7,854,510 B2 | 12/2010 | Verdooner et al. | |
| 8,237,844 B2 | 8/2012 | Blais-ouellette et al. | |
| 8,388,134 B2 | 3/2013 | Goldstein et al. | |
| 8,537,260 B2 | 9/2013 | Daigle | |
| 8,814,362 B2 | 8/2014 | Verdooner | |
| 8,955,969 B2 | 2/2015 | Hartung et al. | |
| 9,220,403 B2 | 12/2015 | Hartung et al. | |
| 9,314,155 B2 | 4/2016 | Verdooner | |
| 9,451,909 B2 | 9/2016 | Hartung et al. | |
| 9,480,394 B2 | 11/2016 | Verdooner | |
| 9,521,950 B2 | 12/2016 | Verdooner | |
| 9,521,975 B2 | 12/2016 | Verdooner et al. | |
| 9,566,000 B2 | 2/2017 | Verdooner et al. | |
| 9,730,580 B2 | 8/2017 | Verdooner | |
| 9,808,155 B2 | 11/2017 | Verdooner | |
| 9,854,963 B2 | 1/2018 | Verdooner | |
| 10,098,540 B2 | 10/2018 | Vince et al. | |
| 2003/0004418 A1 | 1/2003 | Marmorstein | |
| 2004/0152068 A1 | 8/2004 | Goldstein et al. | |
| 2005/0274913 A1* | 12/2005 | Sawada | G01B 11/2518 250/559.05 |
| 2008/0088795 A1 | 4/2008 | Goldstein et al. | |
| 2010/0105098 A1 | 4/2010 | Frederiske | |
| 2010/0110515 A1 | 5/2010 | Blais-ouellette et al. | |
| 2010/0328661 A1 | 12/2010 | Blais-ouellette et al. | |
| 2011/0116041 A1 | 5/2011 | Hartung et al. | |
| 2012/0008133 A1 | 1/2012 | Silny et al. | |
| 2012/0013915 A1* | 1/2012 | Okamura | A61B 3/0008 356/479 |
| 2012/0207681 A1 | 8/2012 | Verdooner | |
| 2012/0327406 A1 | 12/2012 | Dubowski et al. | |
| 2013/0135580 A1 | 5/2013 | Hartung et al. | |
| 2013/0259071 A1 | 10/2013 | Blais-ouellette | |
| 2014/0154703 A1 | 6/2014 | Skelley et al. | |
| 2014/0348750 A1 | 11/2014 | Vince et al. | |
| 2014/0350379 A1 | 11/2014 | Verdooner | |
| 2015/0081168 A1* | 3/2015 | McWithey | B60Q 1/115 701/36 |
| 2016/0206199 A1 | 7/2016 | Blanco et al. | |
| 2016/0278677 A1 | 9/2016 | Kerbage et al. | |
| 2017/0319063 A1 | 11/2017 | Verdooner et al. | |
| 2018/0008147 A1* | 1/2018 | Wax | G01B 9/02091 |

FOREIGN PATENT DOCUMENTS

| | | |
|---|---|---|
| EP | 1913866 A1 | 4/2008 |
| EP | 2416136 A2 | 2/2012 |
| EP | 2420179 A2 | 2/2012 |
| JP | 2017029533 A | 2/2017 |
| WO | 03018068 A1 | 3/2003 |
| WO | 2005/092008 A2 | 10/2005 |
| WO | 2006/062987 A2 | 6/2006 |
| WO | 2008144065 A1 | 11/2008 |
| WO | 2010033861 A1 | 3/2010 |
| WO | 2011/076050 A1 | 6/2011 |
| WO | 2012/045177 A1 | 4/2012 |
| WO | 2015066270 | 5/2015 |
| WO | 2005/092008 A2 | 10/2015 |
| WO | 2016/041062 A1 | 3/2016 |
| WO | 2018026683 A1 | 2/2018 |

OTHER PUBLICATIONS

International Preliminary Report on Patentability from International Application No. PCT/US2017/021787, dated Sep. 20, 2018, 9 pp.
Wijngaarden et al., "Emerging ocular biomarkers of Alzheimer disease," Clinical and Experimental Ophthalmology 2017, Royal Australian and New Zealand College of Ophthalmologists, Oct. 19, 2016, 9 pp.
More et al., "Early Detection of Amyloidopathy in Alzheimer's Mice by Hyperspectral Endoscopy," Invest Ophthalmol Vis Sci, vol. 57, Np. 7, Jun. 2016, 8 pp.
"Hyperspectral imaging," Wikipedia the Online Encyclopedia, accessed from https://en.wikipedia.org/wiki/Hyperspectral_imaging, last edited on Mar. 14, 2019, accessed on Mar. 29, 2019, 12 pp.
Khoobebi et al., "Hyperspectral Imaging for Measurement of Oxygen Saturation in the Optic Nerve Head," Investigative Ophthalmology & Visual Science Journal, vol. 45, No. 5, May 2004, 9 pp.
Schweitzer et al., "Imaging Spectrometry in Ophthalmology—Principle and Applications in Microcirculation and in Investigation of Pigments," Ophthalmic Research, Department of Ophthalmology, University of Jena, Germany, Applicant points out, in accordance with MPEP 609.04(a), that the year of publication, 1996, is sufficiently earlier than the effective U.S. filing date, so that the particular month of publication is not in issue.
Examination Report from counterpart Australian Application No. 2017229876, dated Apr. 9, 2019, 3 pp.
First Office Action and Search Report, and translation thereof, from counterpart Chinese Application No. 201780028377.X, dated May 7, 2020, 19 pp.
Examination Report from counterpart Australian Application No. 2017229876, dated Apr. 8, 2020, 3 pp.
Response to Examination Report dated Apr. 9, 2019, from counterpart Australian Application No. 2017229876, filed Mar. 30, 2020, 13 pp.
Response to First Chinese Office Action dated May 7, 2020, from counterpart Chinese Application No. 201780028377.X, filed Sep. 18, 2020, 18 pages.

* cited by examiner

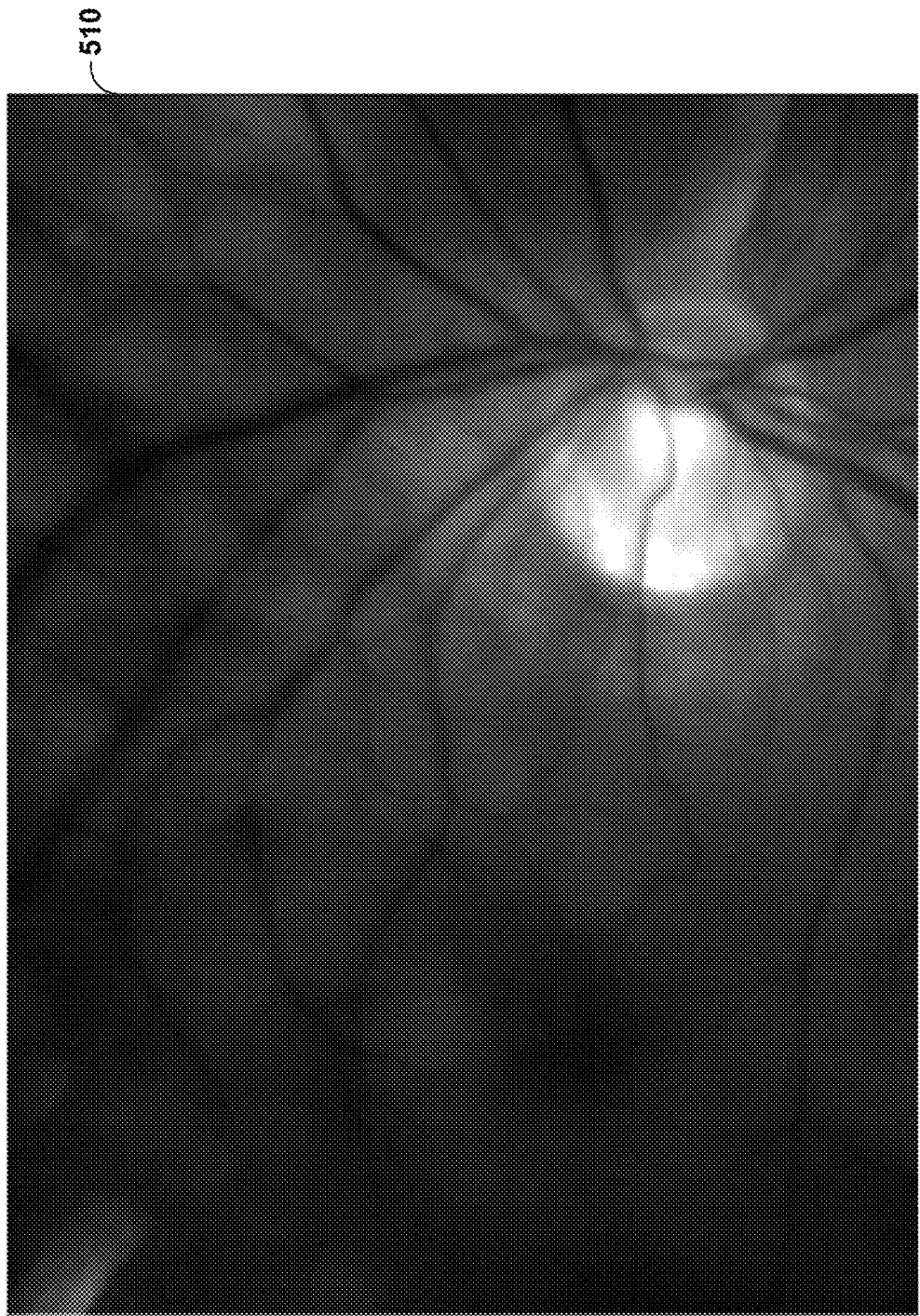
FIG. 9 RETINA OF ALZHEIMER'S PATIENT

SPECTRAL-SPATIAL IMAGING DEVICE

CROSS-REFERENCE TO RELATED APPLICATIONS

This application is a national stage entry under 35 U.S.C. § 371 of PCT Application No. PCT/US2017/021787, filed Mar. 10, 2017, which claims the benefit of U.S. Provisional Application No. 62/306,520, filed Mar. 10, 2016. The entire contents of PCT Application No. PCT/US2017/021787 and U.S. Provisional Application No. 62/306,520 are incorporated herein by reference.

TECHNICAL FIELD

The disclosure relates to spectral imaging.

BACKGROUND

Optical spectra for light reflected from objects may be obtained by replacing a conventional imaging system of a fore-optic device, such as a lens camera or microscope, with an imaging spectrograph. With this configuration, optical spectra from a single line on the object are obtained by exposing the camera to light reflected from the object. The locations where spectra originate on the object are known only approximately if a separate picture of the recorded surface is taken afterward. If the object is attached to a moving platform with controlled motion, or to a motorized microscope stage, a set of lines containing spectra can be obtained, such that individual spectra can be referenced to physical features of the object using hyperspectral imaging (HSI) methods. By this technique of motion-controlled moving platform with HSI, a conventional image with the spectrum of every point on a grid can be obtained, hence this method is commonly used to map spectra to object features.

"Snapshot" HSI systems can obtain spectra from all points on an image in a single instant. However, such systems do not obtain a continuous spectrum with regularly spaced wavelengths, but rather one that has a limited number (less than thirty) of unequally spaced wavelengths, and which can require extensive computation to reconstruct.

SUMMARY

In general, an imaging system to synchronously record a spatial image and a spectral image of a portion of the spatial image is described. In some examples, a beam splitter of the imaging system splits an optical beam, obtained from a viewing device, into a first split beam directed by the imaging system to a spatial camera and a second split beam directed by the imaging system to the entrance slit of an imaging spectrograph that is coupled to a spectral camera. An electronic apparatus synchronously triggers the spatial camera and the spectral camera to synchronously record a spatial image and a spectral image, respectively.

The entrance slit of the imaging spectrograph defines an area of the image to be separated into spectra by the imaging spectrograph. Because the first split beam and the second split beam are split from a common optical beam, the entrance slit of the imaging spectrograph defines the area of the image that is separated into spectra and correlates to a corresponding area of the spatial image. The imaging system may consequently enable the synchronous spectral recording of the optical spectra of points in a defined area of an image and recording of the spatial image for the image including the defined area. Because the optical spectra of points in the defined area of the image map to the corresponding points in the spatial image, the imaging system may enable the assignment of optical spectra directly to physical features contained in a conventional image, by virtue of the one-to-one mapping between a spectra and a location in the images. In other words, the imaging system and techniques described here may allow users to produce a substantially exact and documented assignment between recordings of optical spectra and the specific physical or structural features of the measured object.

The image system may provide advantages in multiple fields that perform analysis based on chemometric spectral data, such as materials science, biomedical research, and medical diagnostics. In ophthalmology, applications may include retinal metabolic imaging, role of pigmentation in retinal disorders (macular degeneration, retinitis pigmentosa), blood-borne diseases, and Alzheimer's disease screening, as well as screening for Parkinson's disease, Huntington's disease, and other amyloid-related neurological diseases. In wound healing, applications may include assessment for healing in chronic wounds and pathogen detection. As another example, if spectral recordings were to be used in colon cancer detection, the imaging system may permit the assignment of the spectral correlates of suspected cancerous tissue with specific structural features of the tissue.

In one example, a spatial-spectral imaging apparatus includes a beam splitter configured to receive a light beam carrying an image of an object and to split the light beam into a first split light beam and a second split light beam; an imaging spectrograph configured to receive the first split light beam and disperse a range of wavelengths of the first split light beam to form a spectral image comprising a plurality of spectra; a spatial image camera configured to receive the second split light beam; and a spectral image camera configured to receive the spectral image from the imaging spectrograph, wherein the spectral image camera and the spatial image camera are configured to synchronously record, respectively, the spectral image and a spatial image carried by the second split light beam.

In another example, an imaging system includes a retinal viewing device configured to output a light beam carrying an image of an object; and a spatial-spectral imaging apparatus comprising: a beam splitter configured to receive the light beam carrying the image of the object and to split the light beam into a first split light beam and a second split light beam; an imaging spectrograph configured to receive the first split light beam and disperse a range of wavelengths of the first split light beam to form a spectral image comprising a plurality of spectra; a spatial image camera configured to receive the second split light beam; and a spectral image camera configured to receive the spectral image from the imaging spectrograph, wherein the spectral image camera and the spatial image camera are configured to synchronously record, respectively, the spectral image and a spatial image carried by the second split light beam.

In another example, a method includes triggering a spatial-spectral imaging apparatus having a spectral image camera and a spatial image camera to trigger the spectral image camera and the spatial image camera to synchronously record, respectively, a spectral image of an object and a spatial image of the object.

The details of one or more examples are set forth in the accompanying drawings and the description below. Other features, objects, and advantages will be apparent from the description and drawings, and from the claims.

BRIEF DESCRIPTION OF DRAWINGS

FIGS. 8-9 include spatial images recorded by operation of an imaging system, according to techniques described herein.

Like reference characters denote like elements throughout the figures and text.

DETAILED DESCRIPTION

Figure 1:
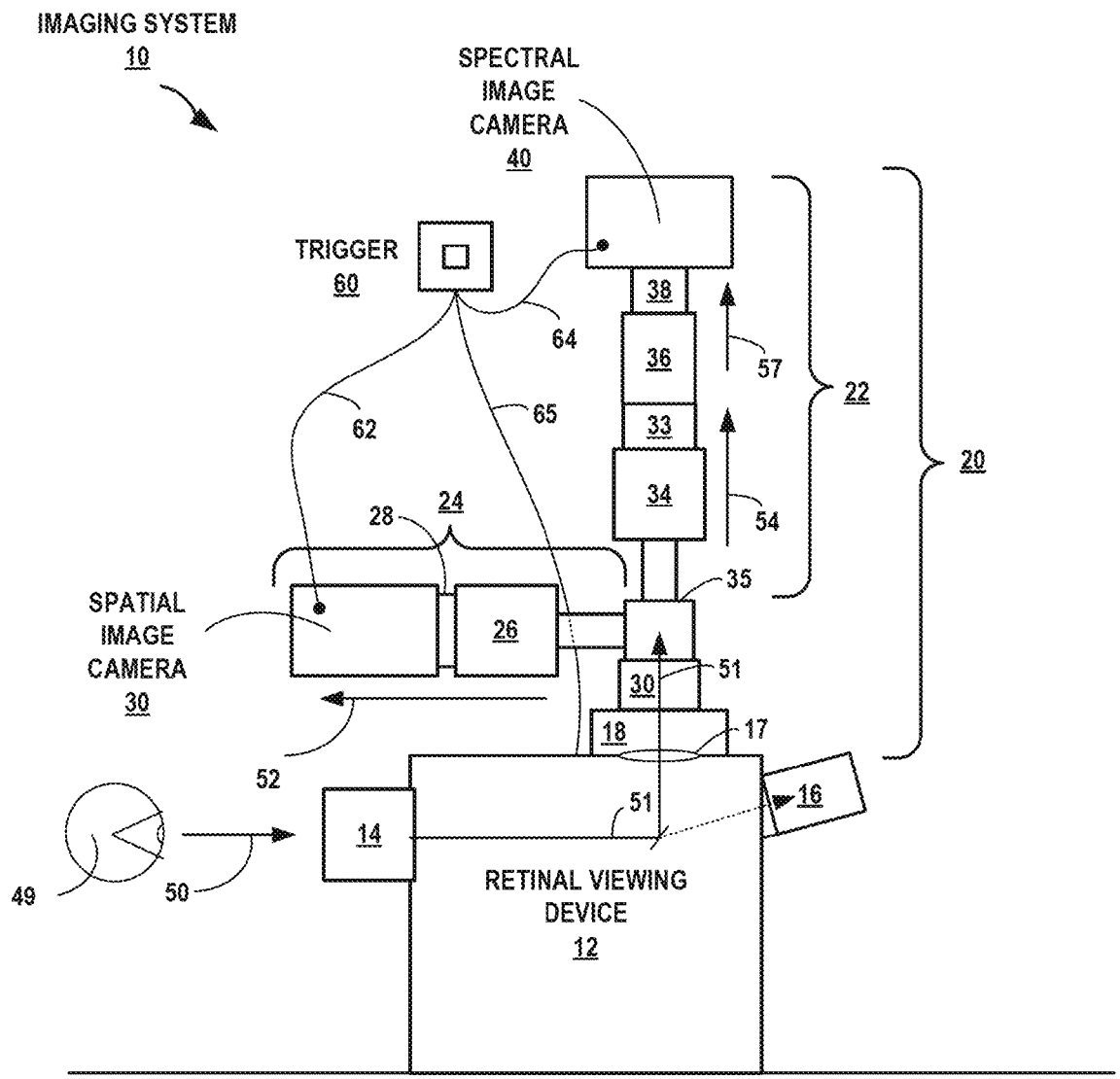
FIG. 1 is a block diagram illustrating an imaging system according to techniques described in this disclosure.

FIG. 1 is a block diagram illustrating an imaging system according to techniques described in this disclosure. In this example, imaging system 10 includes a spatial-spectral imaging apparatus 20 attached to a retinal viewing device 12. Retinal viewing device 12 may represent an ophthalmic fundus camera or other device for obtaining images 50. In this example, images 50 are images of an ocular fundus 49 but images 50 may be of any object. A light source (not show in FIG. 1) illuminates the fundus 49 to produce images 50 input to ophthalmological lens 14 of retinal viewing device 12. While not illustrated in FIG. 1, the retinal viewing device 12 may include a reticulating arm having an attached light that allows the operator to control the gaze direction of the eye being viewed, for ophthalmalogical applications. Fundus 49 may be of a human or other living subject and have independent motion according to muscular activity of the subject. In other words, the subject may have normal eye motion resulting in movement of the fundus and corresponding different images 50 over time.

Ophthalmological lens 14 includes one or more lenses configured to modify images 50 to produce images 51. Retinal viewing device 12 includes an eyepiece (or "ocular lens") 16 to focus images 51 for viewing by a user (not shown) of retinal viewing device 12. Retinal viewing device 12 includes optical hardware configured to direct and output images 51 along an imaging path via output port 17. Output port 17 may represent a secondary camera port of the retinal viewing device 12.

According to techniques described in this disclosure, a spatial-spectral imaging apparatus 20 is attached to a retinal viewing device 12 to receive the images 51 output via output port 17. Spatial-spectral imaging apparatus 20 includes an adaptor 18 configured to attach the spatial-spectral imaging apparatus 20 to retinal viewing device 12. A optical lens 30 focuses images 51 from retinal viewing device 12 to the spatial image camera 30 and the entrance slit of imaging spectrograph 36.

Spatial-spectral imaging apparatus 20 includes an optical beam splitter 35, positioned above the optical lens 30, to split the light beam transporting images 51 into a transmitted light beam and a reflected light beam. Beam splitter 35 may represent a partially-reflecting mirror, a beam splitter cube, a pellicle, a membrane, or other device for splitting the light beam transporting images 51. The transmitted split light beam transmitted by optical beam splitter 35 transmits images 51 as images 54 to spectral imaging path 22 received by spectral image camera 40. The reflected split light beam reflected by optical beam splitter 35 reflects images 51 as images 52 to spatial imaging path 24 received by spatial image camera 30. Spatial imaging path 24 is produced by optical and other devices, as described in further detail below. Spectral imaging path 22 is produced by optical and other devices, as described in further detail below. In some example configurations of spatial-spectra imaging apparatus 20, respective devices for spatial imaging path 22 and spectral imaging path 24 may be swapped such that spatial imaging path 24 receives transmitted images 54 from beam splitter 35 and spectral imaging path 24 receives reflected images 52 from beam splitter 35.

Figure 2:
FIG. 2 is a recorded spatial image of a human fundus, according to techniques described herein.

Spatial imaging path 24 includes a relay optical lens 26, coupled to beam splitter 35 via an optional spacer, to operate on images 52. The relay optical lens 26 adjusts the size of the spatial image so that it is compatible with the size of the film or digital mage sensor of the spatial image camera 30. An optional filter compartment 28 may be loaded with an optical filter to filter one or more wavelengths of images 52. The choice of filter may be application-dependent. For imaging fundus 49, for instance, optional filter compartment 28 may be loaded with a red filter to enhance contrast for images 52 of the fundus 49 to be recorded by spatial image camera 30. Spatial image camera 30 may represent a digital or film camera. Spatial image camera 30 may represent a color or monochromatic camera. Spatial image camera 30 records images 52 as one or more recorded spatial images. An example recorded spatial image is shown in FIG. 2.

Spectral imaging path 22 includes a relay optical lens 34, coupled to beam splitter 35 via an optional spacer, to operate on images 54. The relay optical lens 34 adjusts the size of the spectral image so that it is compatible with the size of the film or digital mage sensor of the spectral image camera 40. The relay optical lens 34 may also set the image focus at the position of the entrance slit 36 of the spectrograph 36. A spectrograph mount 33 is configured to attach imaging spectrograph 36 to relay optical lens 34. A camera mount 38 is configured to attach spectral image camera 40 to imaging spectrograph 36. Spectral image camera 40 may represent a digital or film camera. Spectral image camera 40 may represents a monochromatic camera.

Spectral imaging path 22 may or may not include a filter compartment, i.e., images may pass unfiltered to spectrograph 36 from ophthalmological lens 14. As a result, in some configurations, spatial image camera 30 may receive filtered images of images 50, while spectral image camera 40 may receive unfiltered images of images 50.

An entrance slit of imaging spectrograph 36 receives images 54 from beam splitter 35. The entrance slit may be located in the body of the imaging spectrograph 36 and defines an area of images 54 that passes to and is dispersed by the imaging spectrograph 36. The entrance slit may have a width between 1-100 μm in some examples. The area of images 54 that passes to the imaging spectrograph may substantially conform to the line shape of the entrance slit.

Imaging spectrograph 36 separates (or "disperses") wavelengths included in the area of images 54 into continuous two-dimensional spectra that forms across the lengthwise dimension of the entrance slit, having wavelength axes substantially transverse to the lengthwise-dimension of the entrance slit of the imaging spectrograph 36. In other words, the entrance slit disperses wavelengths to form spectra whose wavelength axes are parallel to the transverse direction of the entrance slit. For a digital camera, this same direction of the spectra may be oriented with columns (or rows) of pixels on a two-dimensional image sensor of the digital camera. The entrance slit creates spectra continuously at every point along its length, which may be oriented parallel to rows (or columns) of pixels on a two-dimensional image sensor of a digital camera. The spatial-spectral image created by this process may be recorded as a single image frame.

Figure 3:
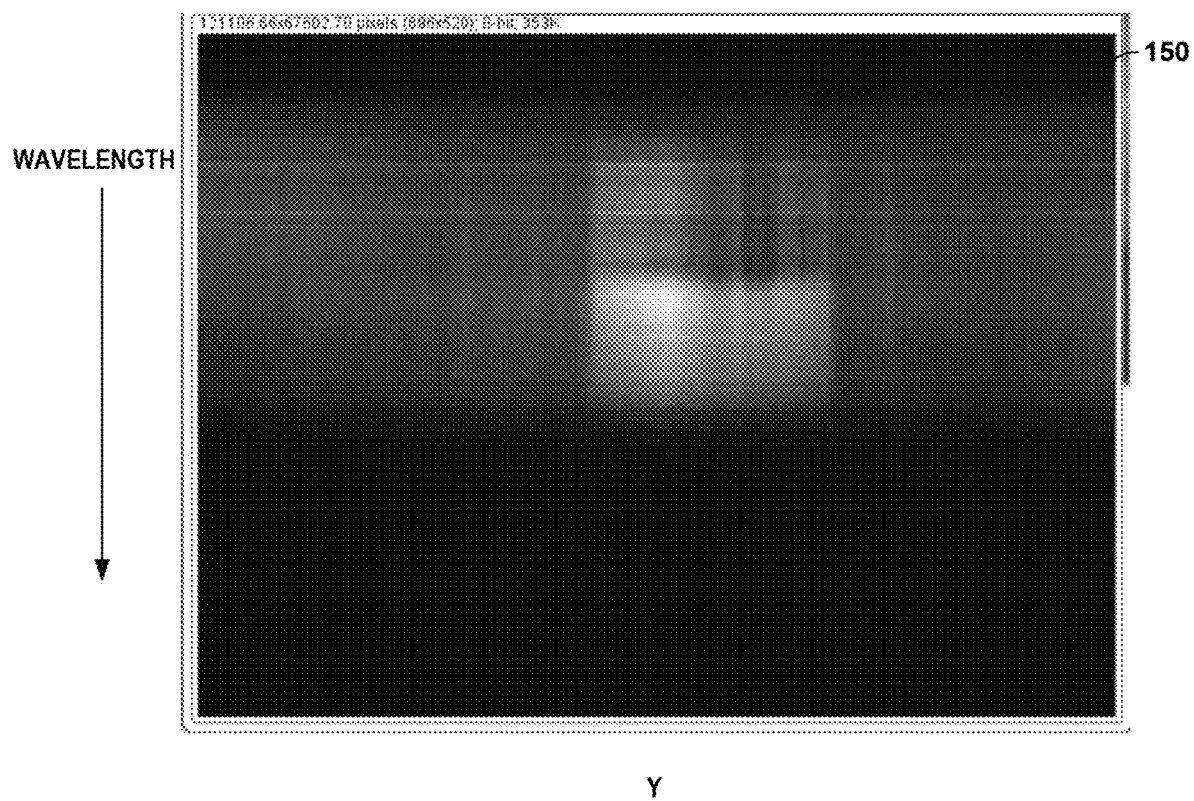
FIG. 3 is a recorded spectral image which depicts the optical spectrum of each point along a line crossing the spatial image of FIG. 2, according to techniques of this disclosure.

The continuous spectra for the area of images 54 form a spectral image 57 output to spectral image camera 40, which records spectral images 57 as one or more recorded spectral images and stores the recorded spectral images to a storage medium, such as a hard drive. An example recorded spectral image is shown in FIG. 3. Because the digital camera image sensor has discrete detection elements, a recorded spectral image 57 represents multiple spectra having wavelength axes parallel to the traverse direction of the entrance slit. Post-processing of a recorded spectral image 57 may be used to combine two or more spectra of the recorded spectral image 57 for display or analysis.

In some examples, beam splitter 35 is configured to reflect approximately 30% of the light beam from output port 17 along imaging path 24 and to transmit approximately 70% of the light beam along imaging path 22. A higher proportion of the light beam received at spectral image camera 40 versus spatial image camera 30 in this way may compensate for the spectral dilution of wavelengths along pixels of spectral images 57 recorded by spectral image camera versus the spatial images 52 recorded by spatial image camera 30.

Imaging system 10 includes a trigger device 60 ("trigger 60") communicatively coupled, via respective signal links 62 and 64, to spatial image camera 30 and spectral image camera 40. Signal links 62 and 64 may represent wired or wireless links for transmitting signals that, when received by cameras 30 and 40, cause the cameras to take a photograph. Trigger 60 may represent any electronic apparatus configured to source triggers, such as packets, electrical signals, optical signals, or other types of signals to cause camera 30 and 40 to take photographs. Common trigger 60 may be manually or automatically initiated. For example, a user (such as a clinician or researcher) may manually press a button of trigger 60 that initiates respective signals to cameras 30 and 40. As another example, a periodic timer of trigger 60 may initiate signals to cameras 30 and 40. For fundus or other ophthalmological applications, a user of imaging system 10 may direct a gaze of the subject using an articulating light system or with verbal instructions and initiate trigger 60 when the gaze of the subject is in a desired direction.

In some examples, including the illustrated example of FIG. 1, trigger 60 is also communicatively coupled, via signal link 65, to retinal viewing device 12. The common trigger 60 may further signal retinal viewing device 12 to, e.g., illuminate the subject (e.g., fundus 49) by generating a flash. The signal sent via signal link 65 may be synchronous with signals sent via signal links 62, 64 such that the cameras 30 and 40 take photographs of subjects illuminated by the retinal viewing device 12.

Spectral image camera 40 and spatial image camera 30 are configured to record images (e.g., take photographs) in response to receiving signals from trigger 60. When triggered by common trigger 60, spectral image camera 40 and spatial image camera 30 synchronously record a spectral image from spectral images 57 and spatial image from images 52, respectively. Spectral image camera 40 and spatial image camera 30 may record association data in association with respective recorded images to enable subsequent association of the recorded images as representing a spatial image and spectral image recorded at the same time (i.e., synchronously). Association data may represent an image number stored by each camera 30, 40 for images (e.g., an integer indicating the 1st, 2nd, etc. photograph taken for a session, and in some cases indicating in a file name for a recorded image), a timestamp, or other data indicating that a given pair of recorded spectral and spatial images correlate in time.

In this way, the imaging system 10 synchronously records a spatial image and a spectral image of a portion of the spatial image. As noted above, the entrance slit of the imaging spectrograph defines an area of the images 54 that passes to the imaging spectrograph 36, by which the light from the area is dispersed into a continuous set of spectra, and is recorded by the spectral image camera 40. Because the first split beam carrying images 54 and the second split beam carrying images 52 are split from a common optical beam carrying images 51, the entrance slit of the imaging spectrograph 36 defines the area of a given image that is separated into spectra and correlates to a corresponding area of the spatial image. The imaging system 10 may consequently enable the synchronous recording of a spectral image of the optical spectra of points in a defined area of an image together with a recording of the spatial image for the spectral image that includes the defined area. In some examples, the imaging system 10 produces spectra with evenly space wavelengths, up to several hundred wavelengths over the visible and near infrared range. Because the optical spectra of points in the defined area of the image map to the corresponding points in the spatial image, the imaging system 10 may enable the assignment of optical spectra directly to physical features contained in a conventional image, by virtue of the one-to-one mapping between a spectra and a location in the images. In other words, the imaging system 10 and techniques described here may allow users to produce a substantially exact and documented assignment between recordings of optical spectra and the specific physical or structural features of the measured object.

The imaging system 10 may in this way provide advantages over imaging systems in which optical spectra from a single line on an object are obtained by exposing the camera to light reflected from the object, and in which the location where spectra originate on the object are approximately determined based on a separate, subsequent (i.e., non-synchronous) picture of the recorded surface. For example, the imaging system 10 may be particularly applicable for applications in which the object that is the image source is not precisely controlled by the user, e.g., has independent motion as in the case of human or other living subjects, or in which the object is sensitive to light. For instance, the imaging system 10 may be particularly applicable where motion-controlled moving platform hyperspectral imaging is not feasible. The imaging system 10 may enable the desired co-assignment of high resolution spectra and object features when it is not necessary to obtain the optical spectrum of every point on a grid, but full documentation of object features around the measured line are nonetheless desirable.

FIG. 2 is a recorded spatial image 100 of the optic disc and retinal surround of a human subject's eye. Line 102 depicts an area of the spatial image 100 that is input to an imaging spectrograph to produce a spectral image synchronously recorded by imaging system 10, as described in this disclosure. Line 102 may correspond in location to an entrance slit of imaging spectrograph 36 of imaging system 102. In some examples, line 102 may span the entire width of spatial image 100. In some examples, line 102 may have a width of one or more pixels.

FIG. 3 is a recorded spectral image 150 which depicts the optical spectrum of each point along line 102 crossing the spatial image 100 of FIG. 2, according to techniques described herein. The spectral image 150 depicts the optical wavelengths of the spectrum along the vertical image dimension, and a one-dimensional image of the object along the horizontal dimension, which corresponds to the center horizon of the spatial image 100. The position of the center horizon in the spatial image 100 is fixed and depicted in FIG. 2 by line 102. As a further illustration of the relationship between images, the brightly reflecting optic disc in the spatial image 100 is associated with a bright band, the spectrum of the disc, in the spectral image 150. Also, blood vessels in the spatial image 100 correspond to the location of dark vertical bands in the spectral image 150. Each column of pixels of spectral image 150 may represent a spectrum for the width of a single pixel on line 102 of spatial image 100. Reflected light spectral plots may be obtained using an image analysis program to measure the light along a vertical line in the spectral image, which is later the object of various specific spectral analyses.

Spatial image 100 and spectral image 150 may be recorded using imaging system 10 according to techniques described in this disclosure.

In order to identify a location of spatial image 100 that corresponds to a spectra of spectral image 150 so as to directly map spectra to coordinates of the spatial image 100 and physical features, the location of line 102 for instances of spatial image 100 recorded by the imaging system 10 may be determined. In some examples, a user may create a target having a discrete contrast agent. By precisely controlling the motion of the target and moving the target until the recorded spectral image indicates that recorded spectra are for the contrast agent, a user of imaging system 10 may determine from synchronously recorded spatial image the location of line 102.

Figure 4:
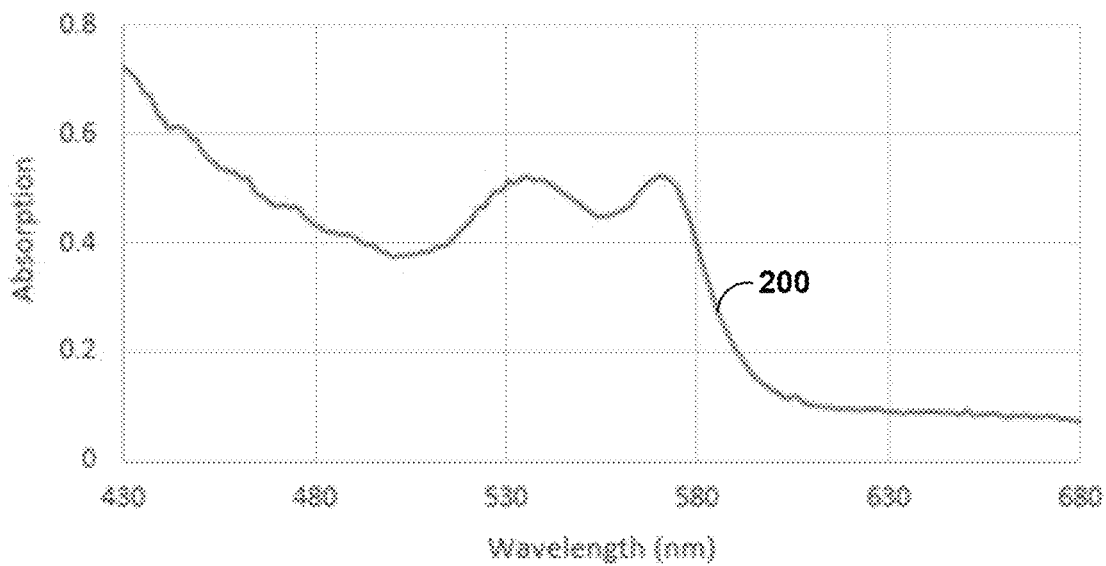
FIG. 4 is a plot of the computed absorption spectrum of capillary blood from the optic disc in the visible light spectrum, in accordance with techniques of this disclosure.

FIG. 4 is a plot of the computed absorption spectrum 200 of capillary blood from the optic disc in the visible light spectrum, in accordance with techniques of this disclosure. The imaging system 10 described in this disclosure may be used to synchronously record spatial and spectral images for a subject. The spatial and spectral images may be usable to detect ophthalmological conditions, retinal diseases, or Alzheimer's disease. Example description for using images to detect Alzheimer's disease is found in U.S. Patent Publication 2014/0348750, published Nov. 27, 2014, which is incorporated by reference herein in its entirety. The computed absorption spectrum is the spectrum produced by capillary blood in the disc tissue, representing oxyhemoglobin. The absorption spectrum is obtained using vertical line profiles from the retinal image and a blank image of a neutral reflecting surface, which together are used to calculate the light absorption. The same or similar image analysis procedures may be used to detect optical signals that represent early-stage Alzheimer's disease. The effects of light scattering from the blood and other small molecules in the retina are also present in this spectrum.

Figure 5:
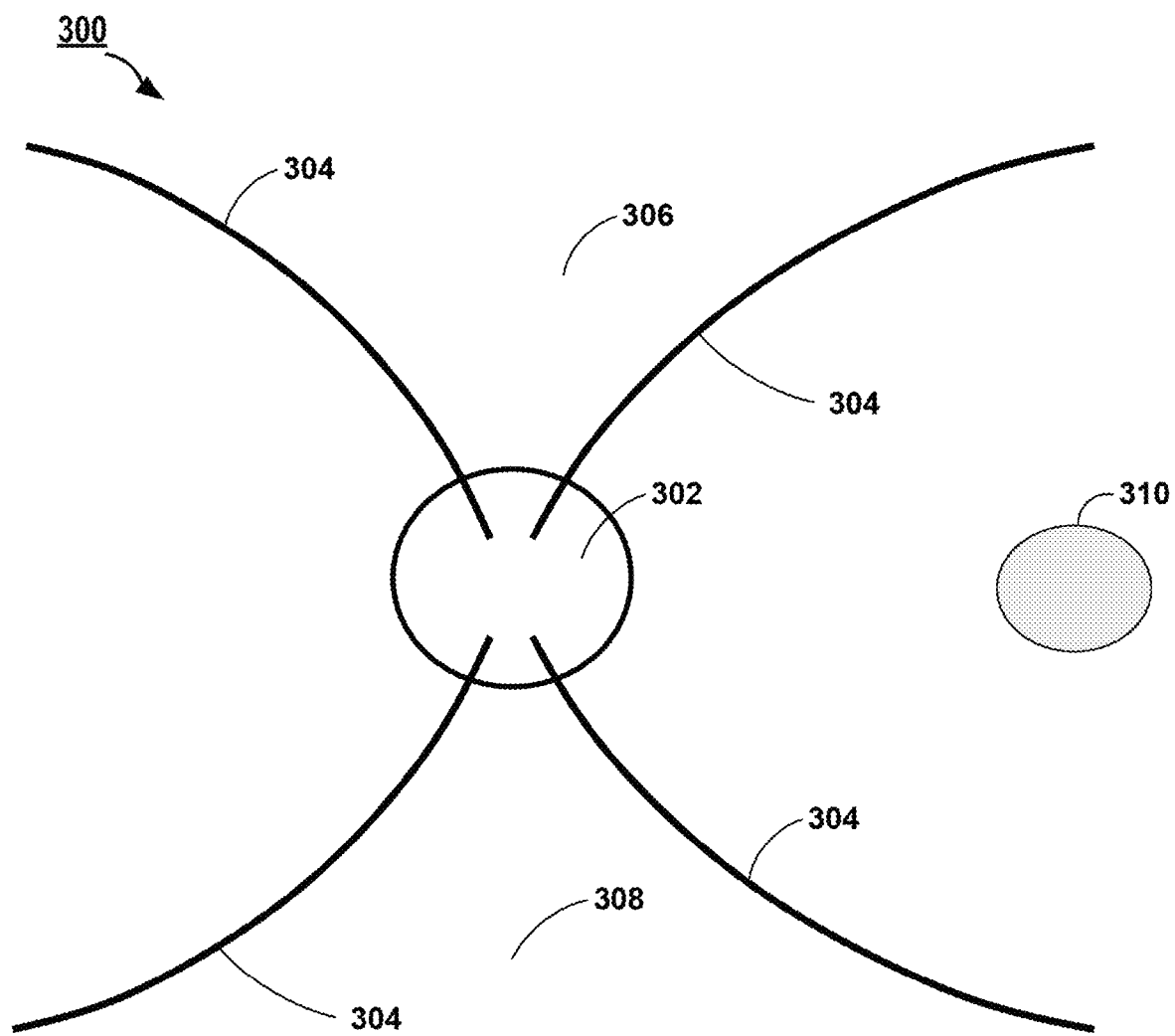
FIG. 5 is a diagram illustrating a conceptual view of select parts of a human fundus.

FIG. 5 is a diagram illustrating a conceptual view of select parts of a human fundus. Diagram 300 illustrates an optic disc 302, a nerve fiber layer and multiple blood vessels 304, an upper retinal area ("upper retina") 306, a lower retinal area ("lower retina") 308, and perifovea. A user of imaging system 10 may focus ophthalmological lens 14 to configure imaging system 10 to synchronously capture one or more spatial and spectral images 50 for parts of a subject fundus 49, including any of the parts illustrated in diagram 300.

Figure 6:
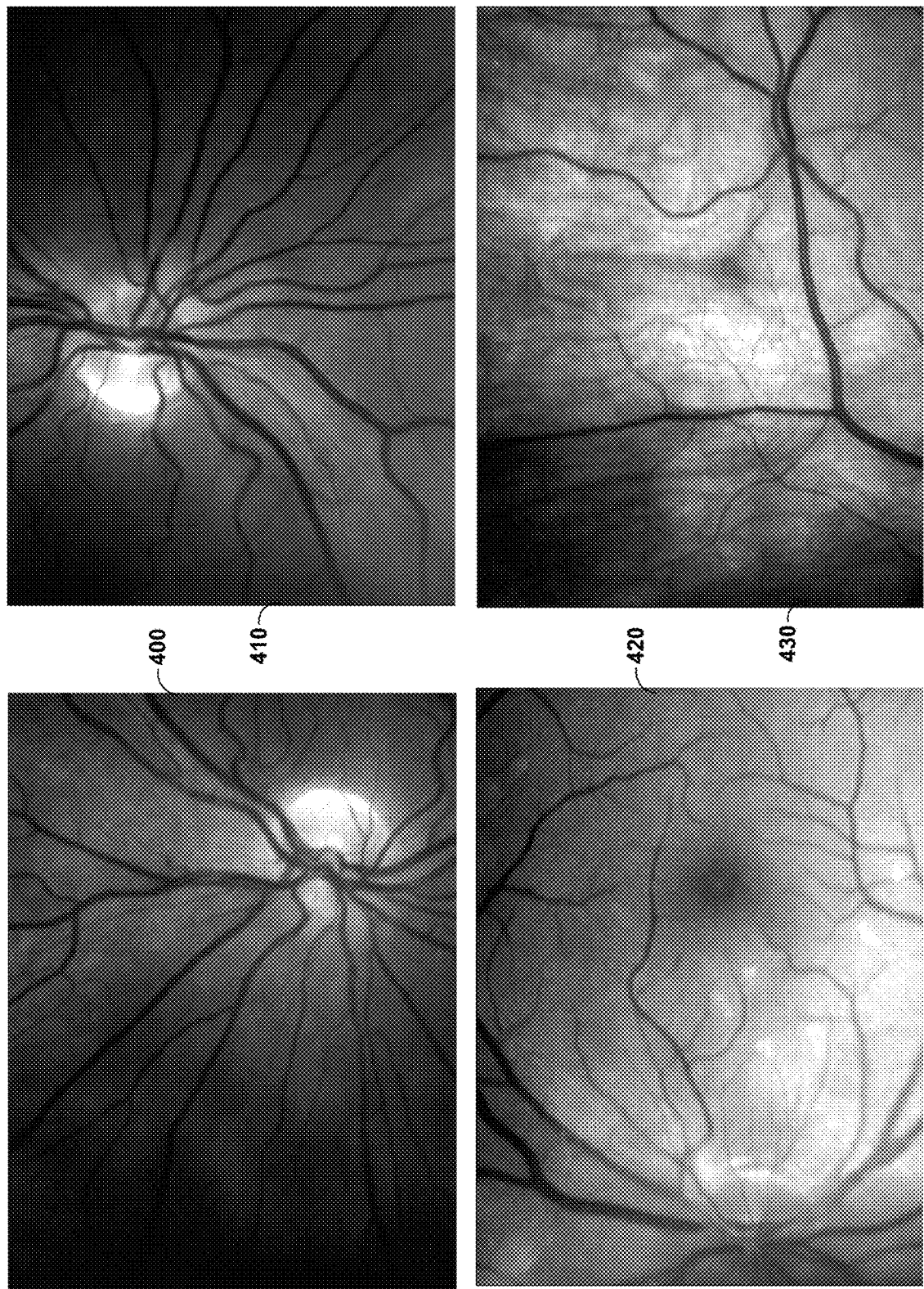
FIG. 6 includes spatial images recorded by operation of an imaging system, according to techniques described herein.

FIG. 6 includes spatial images recorded by operation of an imaging system 10, according to techniques described herein. Spatial image 400 is an image of an optic disc of an example of a subject fundus 49. Spatial image 410 is an image of a nerve fiber layer of an example of a subject fundus 49. Spatial image 420 is an image of a macula of an example of a subject fundus 49. Spatial image 430 is an image of a retina of an example of a subject fundus 49.

Figure 7A:
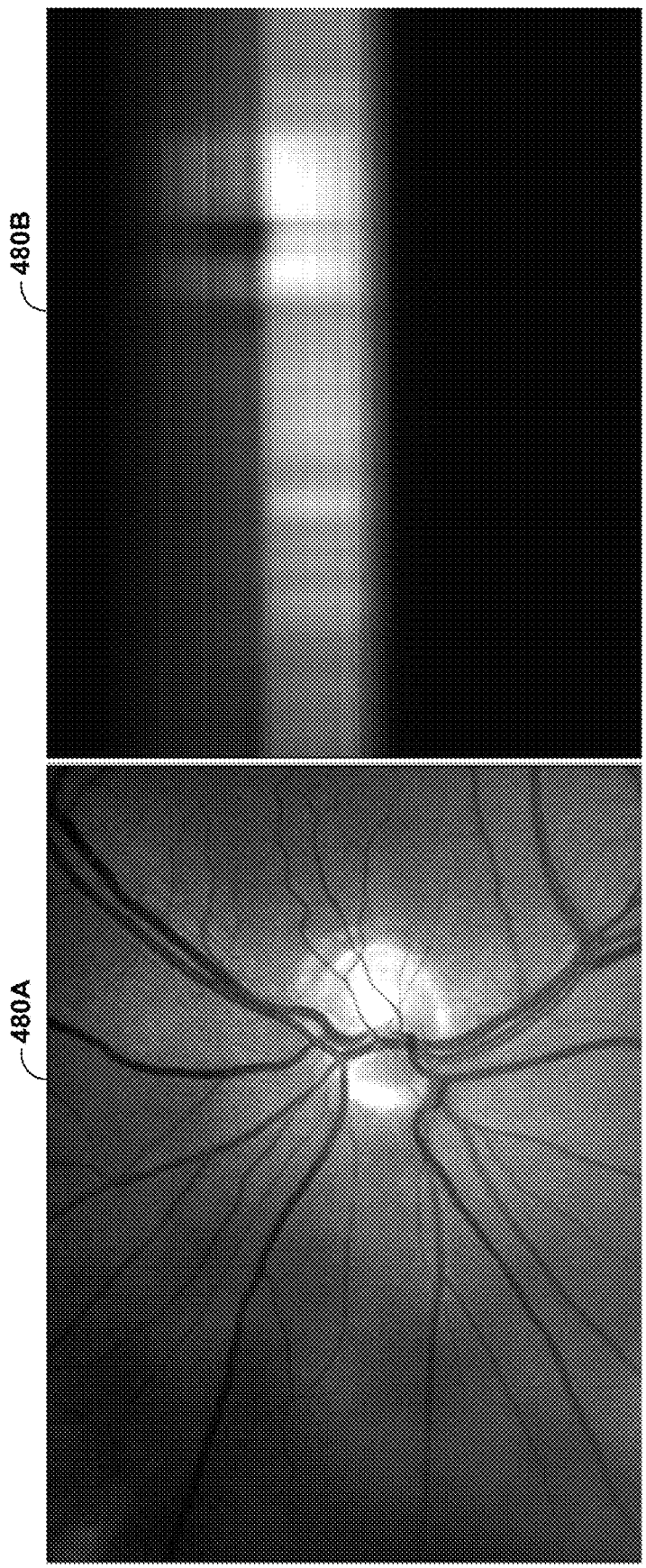
FIGS. 7A-7D each depicts a correlated, recorded pair of spatial and spectral images of a part of a human fundus, recorded by operation of an imaging system, according to techniques described in this disclosure.
Figure 7B:
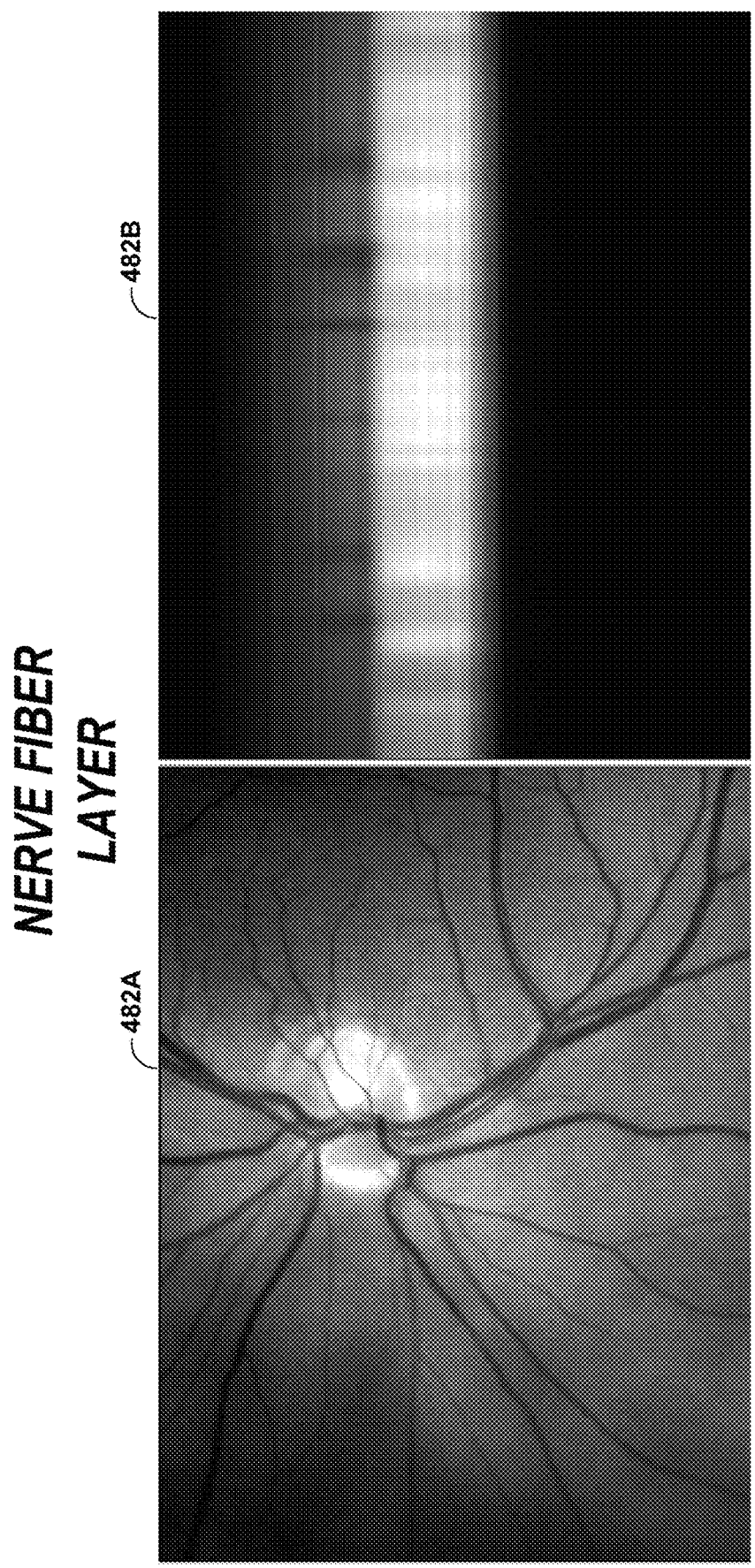
Figure 7C:
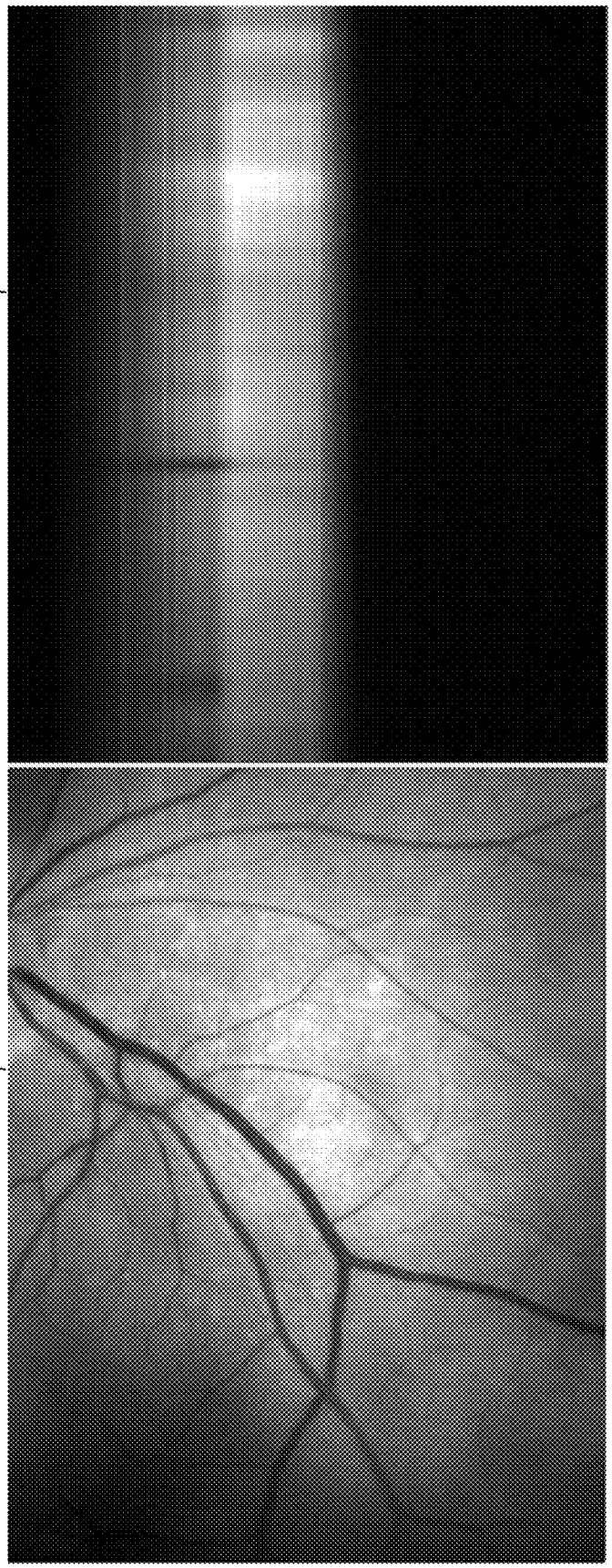
Figure 7D:
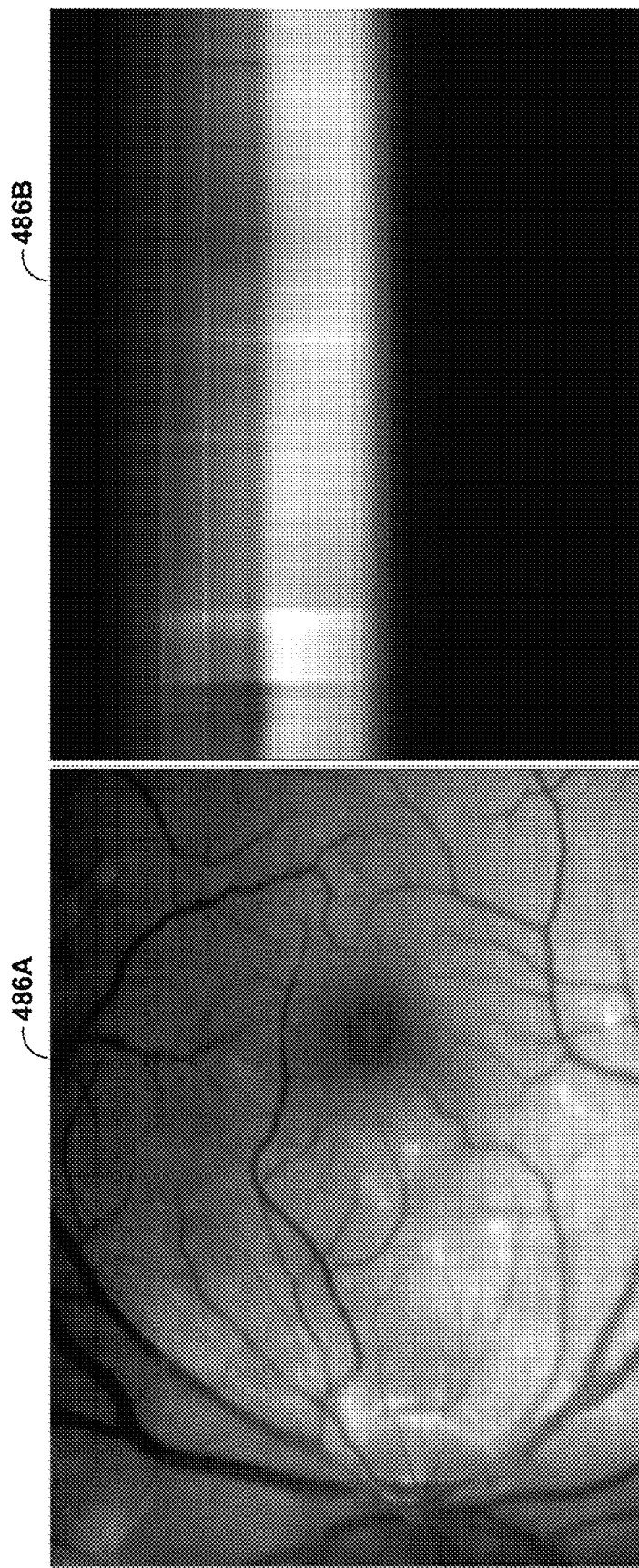

FIGS. 7A-7D each depicts a correlated, recorded pair of spatial and spectral images of a part of a human fundus, recorded by operation of an imaging system 10 according to techniques described in this disclosure. For each pair of spatial-spectral images, the spectral image depicts the optical wavelengths of the spectrum along the vertical image dimension, and a one-dimensional image of the object along the horizontal dimension, which corresponds to the center horizon of the spatial image. FIG. 7A depicts a correlated spatial image 480A and spectral image 480B, of an optic disc. FIG. 7B depicts a correlated spatial image 482A and spectral image 482B, of a nerve fiber layer. FIG. 7C depicts a correlated spatial image 484A and spectral image 484B, of a retina. FIG. 7D depicts a correlated spatial image 486A and spectral image 486B, of a macula.

Figure 8:
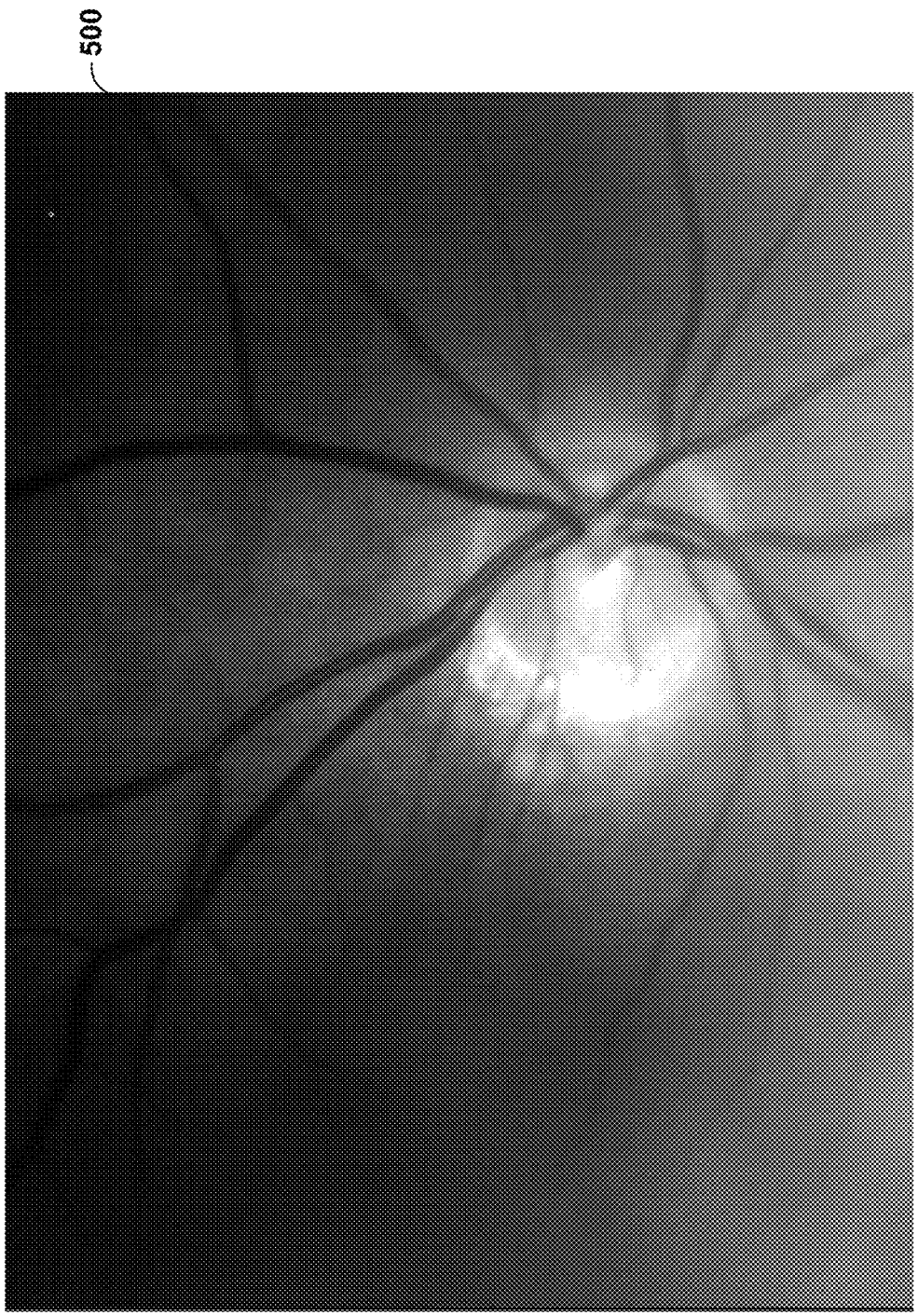
Figure 10A:
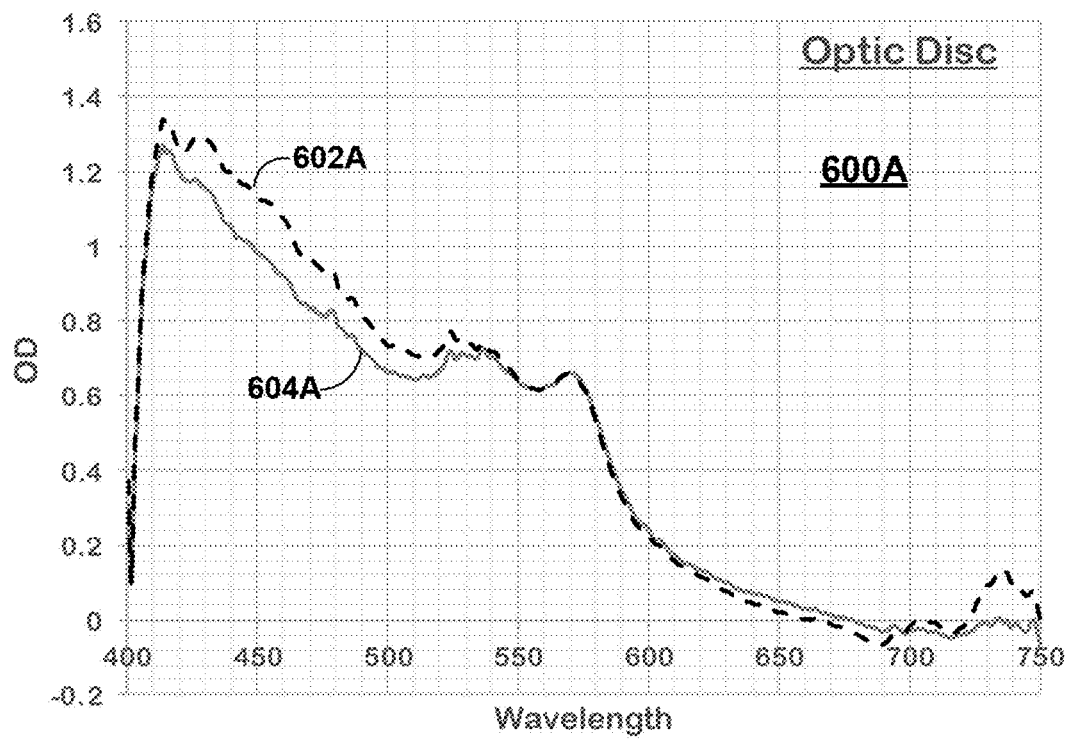
FIGS. 10A-10D each depict a plot of average absorption spectra of capillary blood from a part of human fundi, in the visible light spectrum, computed according to techniques described herein.
Figure 10B:
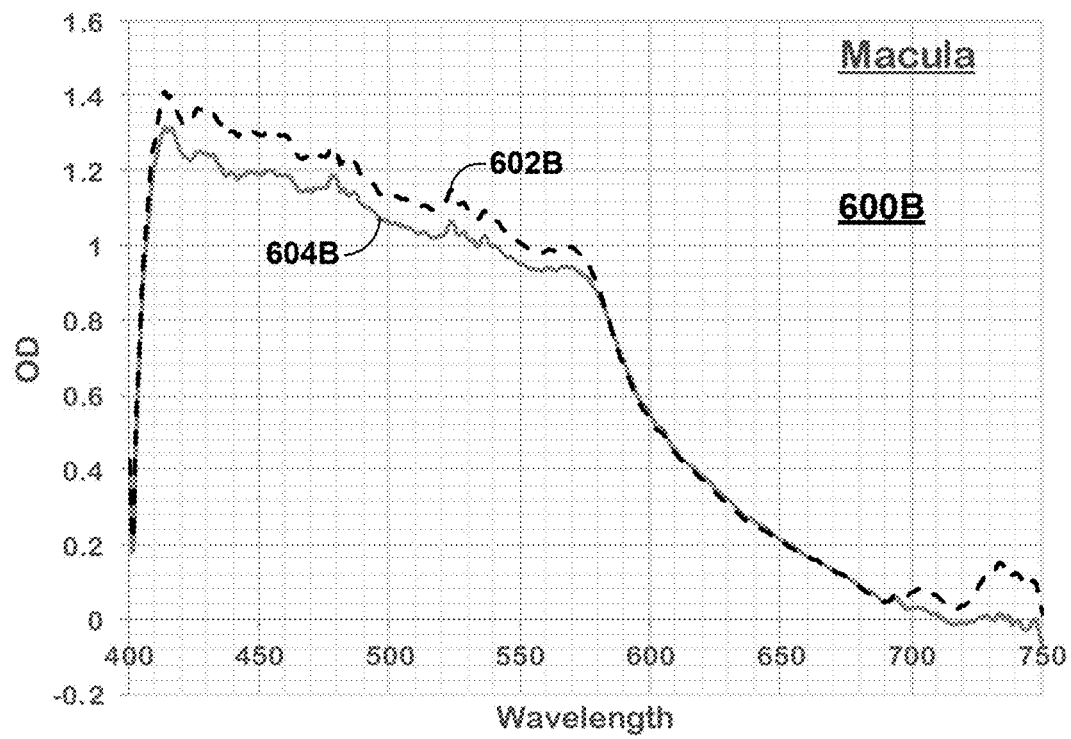
Figure 10C:
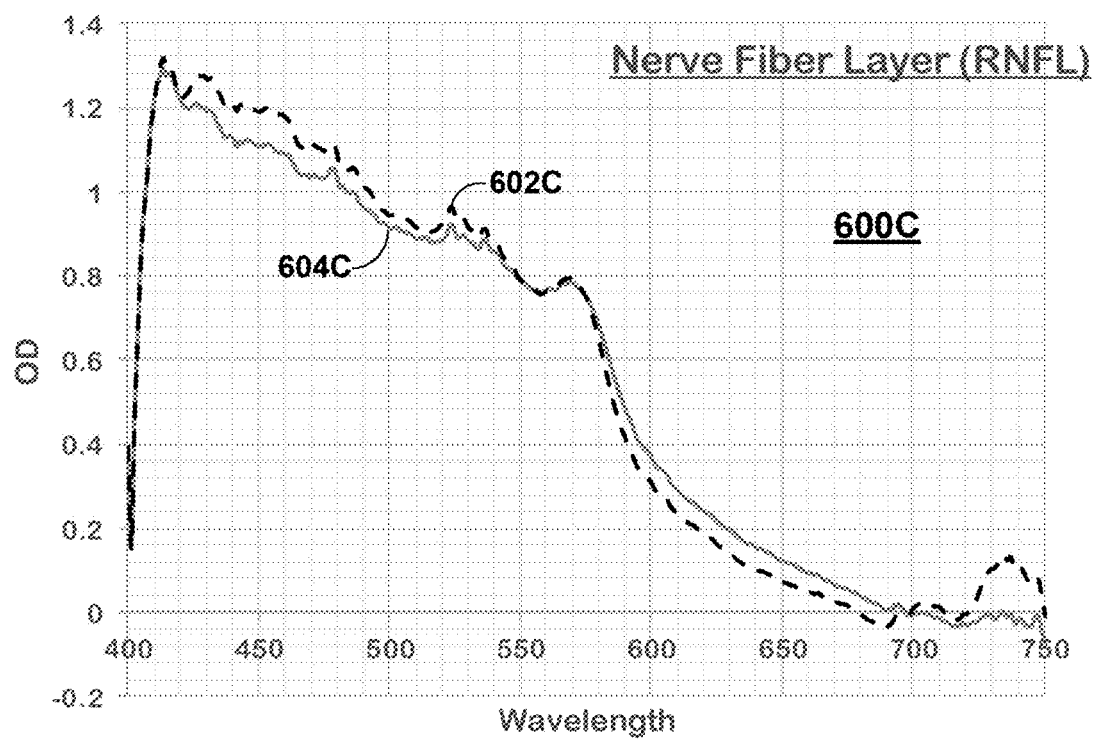
Figure 10D:
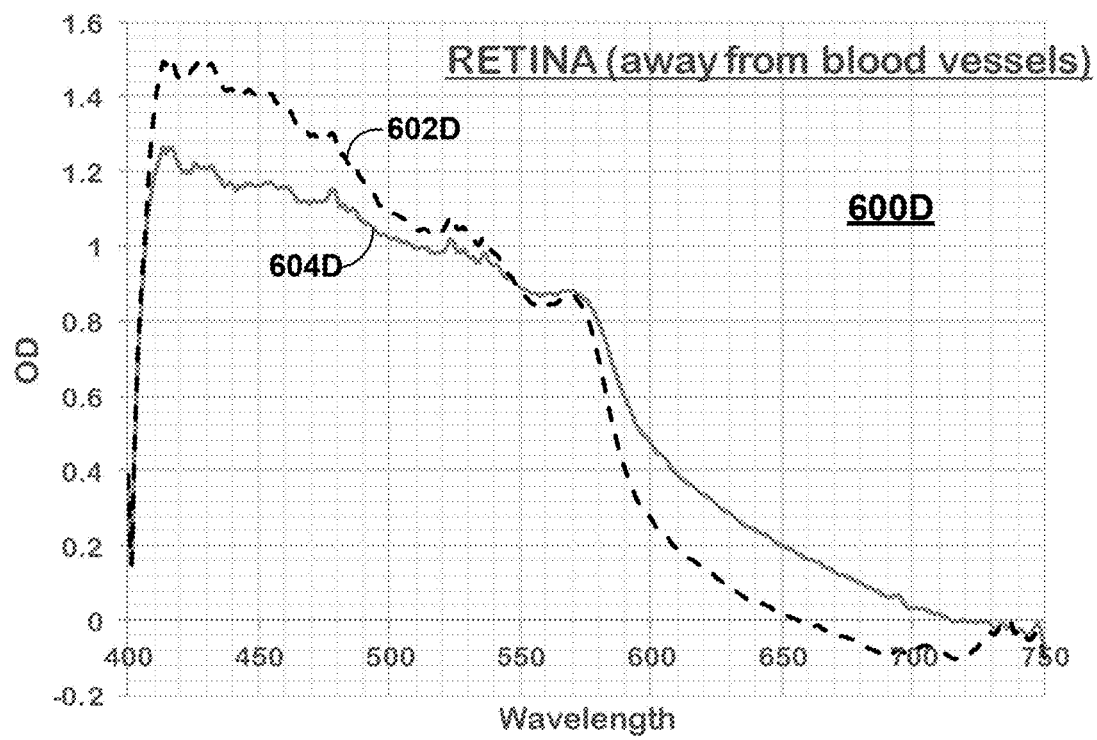
Figure 11A:
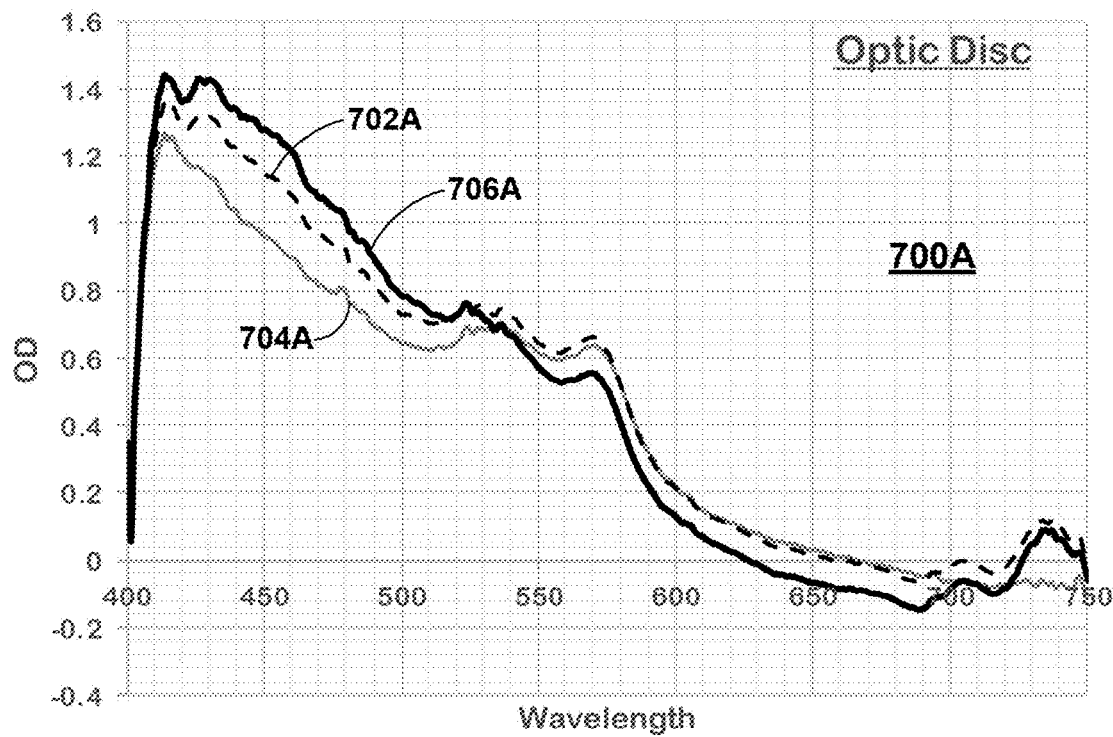
FIGS. 11A-11D each depict a plot of average absorption spectra of capillary blood from a part of human fundi, in the visible light spectrum, computed according to techniques described herein.
Figure 11B:
Figure 11C:
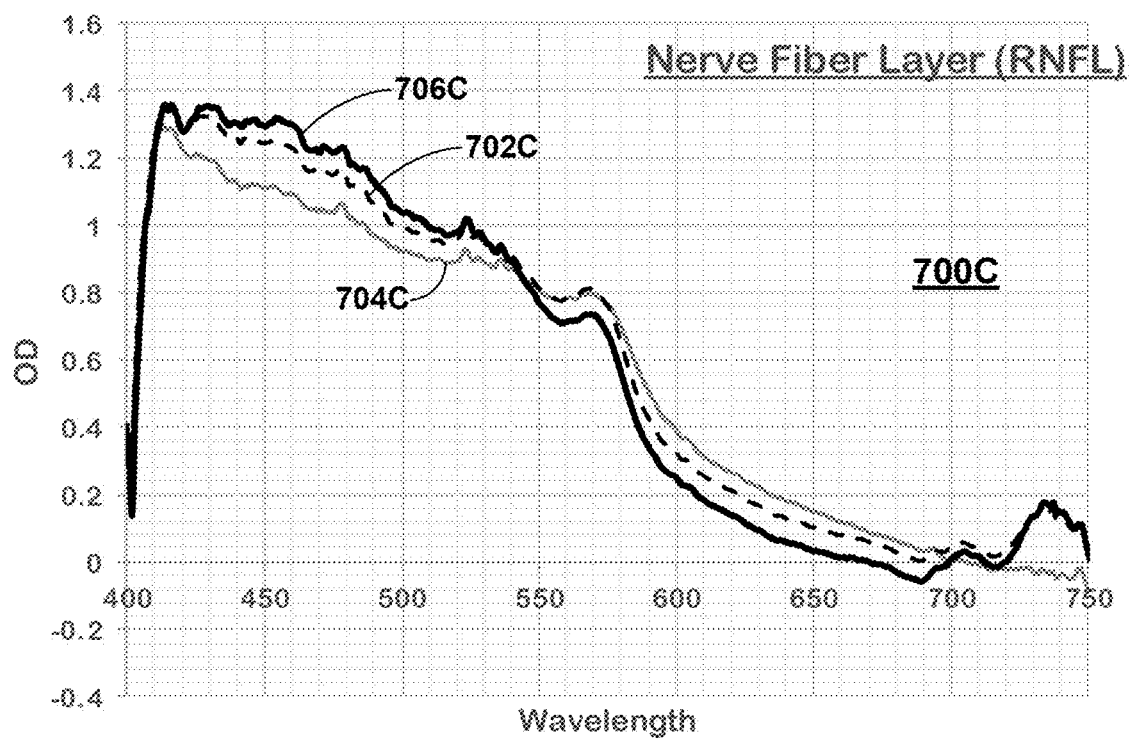
Figure 11D:
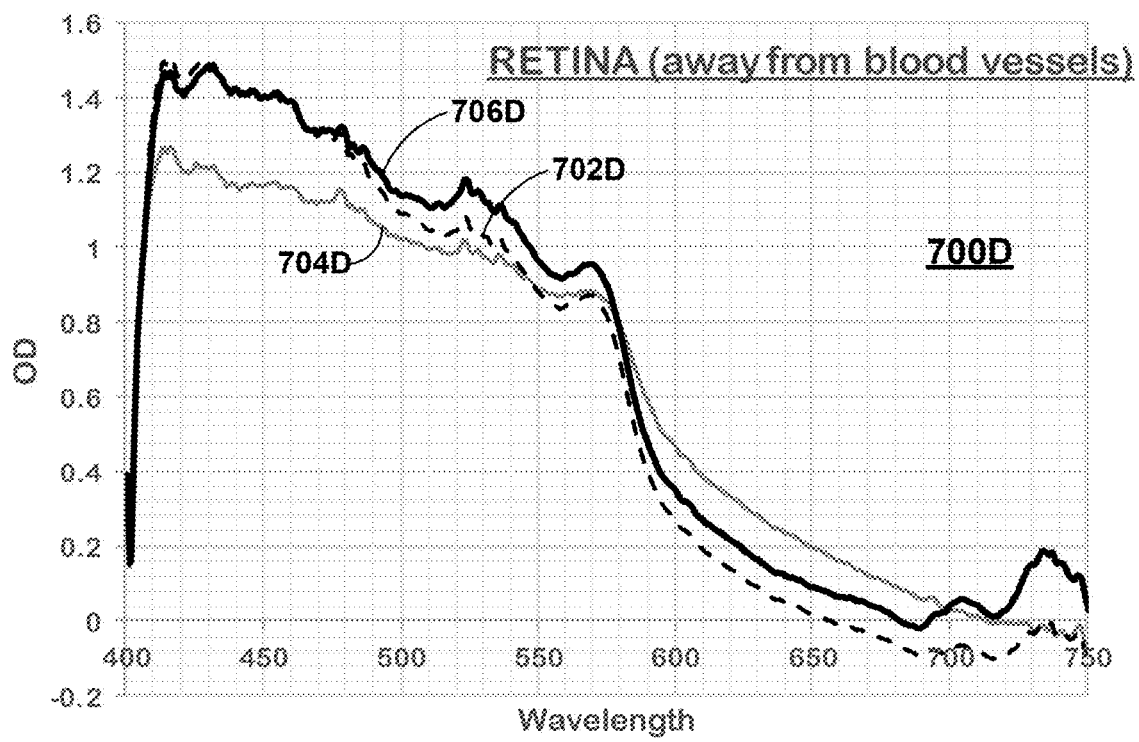

FIGS. 8-9 include spatial images recorded by operation of an imaging system 10, according to techniques described herein. Spatial image 500 is an image of a retina of a human who has not been diagnosed with Alzheimer's disease. Spatial image 510 is an image of a retina of a human who has been diagnosed with Alzheimer's disease.

FIGS. 10A-10D each depict a plot of average absorption spectra of capillary blood from a part of human fundi, in the visible light spectrum, computed according to techniques described herein. The imaging system 10 described in this disclosure may be used to synchronously record spatial and spectral images for a subject. The computed absorption spectrum is the spectrum produced by capillary blood in the disc tissue, representing oxyhemoglobin. The absorption spectrum is obtained using vertical line profiles from the retinal image and a blank image of a neutral reflecting surface, which together are used to calculate the light absorption.

Each of plots 600A-600D includes an average absorption spectrum for a set of control subjects (11 subjects in the example data set used to compute the spectra) and an average absorption spectrum for a different set of Alzheimer's subjects each having an Alzheimer's diagnosis (5 subjects in the example data set used to compute the spectra). Each subject presents a different absorption spectrum, with the average absorption spectrum for a set computed as the average of the values of the respective absorption spectra per wavelength data point.

Plot 600A depicts an average absorption spectrum 602A for the set of Alzheimer's subjects and an average absorption spectrum 604A for the set of control subjects, spectra 602A, 604A computed using spectra from spectral images of optic discs, captured using an example of imaging system 10.

Plot 600B depicts an average absorption spectrum 602B for the set of Alzheimer's subjects and an average absorption spectrum 604B for the set of control subjects, spectra 602B, 604B computed using spectra from spectral images of macula, captured using an example of imaging system 10.

Plot 600C depicts an average absorption spectrum 602C for the set of Alzheimer's subjects and an average absorption spectrum 604C for the set of control subjects, spectra 602C, 604C computed using spectra from spectral images of retina nerve fiber layers (BNFL), captured using an example of imaging system 10.

Plot 600D depicts an average absorption spectrum 602D for the set of Alzheimer's subjects and an average absorption spectrum 604D for the set of control subjects, spectra 602D, 604D computed using spectra from spectral images of retinas, captured using an example of imaging system 10.

FIGS. 11A-11D each depict a plot of average absorption spectra of capillary blood from a part of human fundi, in the visible light spectrum, computed according to techniques described herein. The imaging system 10 described in this disclosure may be used to synchronously record spatial and spectral images for a subject. The computed absorption spectrum is the spectrum produced by capillary blood in the disc tissue, representing oxyhemoglobin. The absorption spectrum is obtained using vertical line profiles from the retinal image and a blank image of a neutral reflecting surface, which together are used to calculate the light absorption.

Each of plots 700A-700D includes an average absorption spectrum for the set of control subjects and an average absorption spectrum for the set of Alzheimer's subjects from the data set for plots 600. Plots 700A-700D also include respective average absorption spectra 706A-706D for an additional data set of subjects presenting early stage Alzheimer's disease. Each subject presents a different absorption spectrum, with the average absorption spectrum for a set computed as the average of the values of the respective absorption spectra per wavelength data point.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

In addition to or as an alternative to the above, the following examples are described. The features described in any of the following examples may be utilized with any of the other examples described herein.

Example 1

A spatial-spectral imaging apparatus comprising: a beam splitter configured to receive a light beam carrying an image of an object and to split the light beam into a first split light beam and a second split light beam; an imaging spectrograph configured to receive the first split light beam and separate a range of wavelengths of the first split light beam to form a spectral image comprising a plurality of spectra; a spatial image camera configured to receive the second split light beam; and a spectral image camera configure to receive the spectral image from the imaging spectrograph, wherein the spectral image camera and the spatial image camera are configured to synchronously record, respectively, the spectral image and a spatial image carried by the second split light beam.

Example 2

The spatial-spectral imaging apparatus of claim 1, wherein the beam split is configured to split approximately 70% of the light beam into the first split light beam and approximately 30% of the light beam into the second split light beam.

Example 3

The spatial-spectral imaging apparatus of claim 1, further comprising: a trigger device configured to send, in response to a common trigger, the spatial image camera and the spectral image camera respective signals, wherein the spatial image camera and the spectral image camera are configured to, in response to receiving the respective signals, synchronously record the spatial image carried by the second split light beam and the spectra image, respectively.

Example 4

The spatial-spectral imaging apparatus of claim 1, wherein the first split light beam carries a first image corresponding to the image and the second split light beam carries a second image corresponding to the image, wherein the imaging spectrograph comprises an entrance slit that defines an area of the first image input to the imaging spectrograph and separated into the range of wavelengths to form the spectral image.

Example 5

The spatial-spectral imaging apparatus of claim 4, wherein the area of the first image correlates to a corresponding area of the second image.

Example 6

The spatial-spectral imaging apparatus of claim 4, wherein each spectra of the plurality of spectrum maps to a point in the second image.

Example 7

The spatial-spectral imaging apparatus of claim 4, wherein the first image comprises: the range of wavelengths for each spectrum of the plurality of spectra in a first dimension; a one-dimensional image of the object in a second dimension, wherein a horizon of the second image corresponds to the one-dimensional image of the object in the second dimension.

Example 8

The spatial-spectral imaging apparatus of claim 1, wherein the range of wavelengths is evenly spaced.

Example 9

The spatial-spectral imaging apparatus of claim 1, wherein the range of wavelengths comprises >30 wavelengths.

Example 10

The spatial-spectral imaging apparatus of claim 1, wherein the range of wavelengths comprises >100 wavelengths.

Example 11

The spatial-spectral imaging apparatus of claim 1, wherein the spatial image camera is configured to generate a recorded spatial image of the spatial image, and wherein the spectral image camera is configured to generate a recorded spectral image of the spectral image.

Example 12

The spatial-spectral imaging apparatus of claim 1, further comprising: an adapter to attach the spatial-spectral imaging apparatus to a retinal viewing device configured to output the light beam carrying the image of the object.

Example 13

The spatial-spectral imaging apparatus of claim 1, further comprising: a filter compartment for an optical filter, the filter compartment located on an imaging path of the second split light beam.

Example 14

The spatial-spectral imaging apparatus of claim 1, wherein the spectral image camera is configured to store first association data for the spectral image, and wherein the spatial image camera is configured to store second association data for the spatial image, the first association data and the second association data usable for determining the spectral image and the spatial image were synchronously recorded.

Example 15

An imaging system comprising: a retinal viewing device configured to output a light beam carrying an image of an object; and the spatial-spectral imaging apparatus of any of claims 1-14.

Example 16

The spatial-spectral imaging apparatus of claim 15, wherein the retinal viewing device comprises a fundus camera.

Example 17

A method comprising: triggering a spatial-spectral imaging apparatus of any of claims 1-14 to trigger the spectral image camera and the spatial image camera to synchronously record images.

Example 18

The method of claim 17, wherein the images are of an object having inherent motion not directly under the control of the user of the spatial-spectral imaging apparatus.

Example 19

The method of claim 17, further comprising: associating a recorded spatial image recorded by the spatial image camera and a recorded spectral image synchronously recorded by the spectral image camera.

Example 20

The method of claim 19, further comprising: based on the association of the recorded spatial image and the recorded spectral image, mapping a spectra of the plurality of spectrum of the recorded spectral image to a point in the recorded spatial image.

Example 21

A method comprising detecting a retinal disease or other disease that presents symptoms through a retina, using a spatial-spectral imaging apparatus of any of claims 1-14.

Example 22

A method comprising detecting one of wound healing, Alzheimer's disease, and aging effects in skin, using a spatial-spectral imaging apparatus of any of claims 1-14.

Example 23

A method comprising performing any of the applications of this disclosure, using a spatial-spectral imaging apparatus of any of claims 1-14.

Moreover, any of the specific features set forth in any of the examples described above may be combined into beneficial examples of the described techniques. That is, any of the specific features are generally applicable to all examples of the invention. Various examples of the invention have been described.

What is claimed is:

1. A spatial-spectral imaging apparatus comprising:
a beam splitter configured to receive a light beam carrying an image of an object and to split the light beam into a first split light beam and a second split light beam;
an imaging spectrograph configured to receive the first split light beam and disperse a range of wavelengths of the first split light beam to form a spectral image comprising a plurality of spectra;
a spatial image camera configured to receive the second split light beam; and
a spectral image camera configured to receive the spectral image from the imaging spectrograph,
wherein the spectral image camera and the spatial image camera are configured to synchronously record, respectively, the spectral image to generate a recorded spectral image of the spectral image and a spatial image carried by the second split light beam to generate a recorded spatial image of the spatial image, the recorded spectral image comprising multiple evenly-spaced optical spectra in a defined area of the image of the object that map to corresponding points in the recorded spatial image to enable the assignment of individual optical spectra of the recorded spectral image to physical features in the recorded spatial image.

2. The spatial-spectral imaging apparatus of claim 1, wherein the beam splitter is configured to split approximately 70% of the light beam into the first split light beam and approximately 30% of the light beam into the second split light beam.

3. The spatial-spectral imaging apparatus of claim 1, further comprising:
a trigger device configured to send, in response to a common trigger, the spatial image camera and the spectral image camera respective signals,
wherein the spatial image camera and the spectral image camera are configured to, in response to receiving the respective signals, synchronously record the spatial image carried by the second split light beam and the spectral image, respectively.

4. The spatial-spectral imaging apparatus of claim 1, wherein the first split light beam carries a first image corresponding to the image and the second split light beam carries a second image corresponding to the image,
wherein the imaging spectrograph comprises an entrance slit that defines an area of the first image input to the imaging spectrograph and having light dispersed into the range of wavelengths to form the spectral image, wherein the area of the first image is the defined area of the image of the object.

5. The spatial-spectral imaging apparatus of claim 4, wherein the area of the first image correlates to a corresponding area of the second image.

6. The spatial-spectral imaging apparatus of claim 4, wherein each spectrum of the plurality of spectra maps to a point in the second image.

7. The spatial-spectral imaging apparatus of claim 4, wherein the first image comprises:
the range of wavelengths for each spectrum of the plurality of spectra in a first dimension;
a one-dimensional image of the object in a second dimension,
wherein a horizon of the second image corresponds to the one-dimensional image of the object in the second dimension.

8. The spatial-spectral imaging apparatus of claim 1, wherein the range of wavelengths is evenly spaced.

9. The spatial-spectral imaging apparatus of claim 1, wherein the range of wavelengths comprises >30 wavelengths.

10. The spatial-spectral imaging apparatus of claim 1, wherein the range of wavelengths comprises >100 wavelengths.

11. The spatial-spectral imaging apparatus of claim 1, wherein the spatial image camera is configured to generate a recorded spatial image of the spatial image, and
wherein the spectral image camera is configured to generate a recorded spectral image of the spectral image.

12. The spatial-spectral imaging apparatus of claim 1, further comprising:
an adapter to attach the spatial-spectral imaging apparatus to a retinal viewing device configured to output the light beam carrying the image of the object.

13. The spatial-spectral imaging apparatus of claim 1, further comprising:
a filter compartment for an optical filter, the filter compartment located on an imaging path of the second split light beam.

14. The spatial-spectral imaging apparatus of claim 1, wherein the spectral image camera is configured to store first association data for the spectral image, and
wherein the spatial image camera is configured to store second association data for the spatial image, the first association data and the second association data usable for determining the spectral image and the spatial image were synchronously recorded.

15. An imaging system comprising:
a retinal viewing device configured to output a light beam carrying an image of an object; and
a spatial-spectral imaging apparatus comprising:
a beam splitter configured to receive the light beam carrying the image of the object and to split the light beam into a first split light beam and a second split light beam;
an imaging spectrograph configured to receive the first split light beam and disperse a range of wavelengths of the first split light beam to form a spectral image comprising a plurality of spectra;
a spatial image camera configured to receive the second split light beam; and
a spectral image camera configured to receive the spectral image from the imaging spectrograph,
wherein the spectral image camera and the spatial image camera are configured to synchronously record, respectively, the spectral image to generate a recorded spectral image of the spectral image and a spatial image carried by the second split light beam to generate a recorded spatial image of the spatial image, the recorded spectral image comprising multiple evenly-spaced optical spectra in a defined area of the image of the object that map to corresponding points in the recorded spatial image to enable the assignment of individual optical spectra of the recorded spectral image to physical features in the recorded spatial image.

16. The imaging system of claim 15, wherein the retinal viewing device comprises a fundus camera.

17. A method comprising:
triggering a spatial-spectral imaging apparatus to trigger a spectral image camera and a spatial image camera to synchronously record, respectively, a spectral image and a spatial image,
wherein the spatial-spectral imaging apparatus comprises:
a beam splitter configured to receive a light beam carrying an image of an object and to split the light beam into a first split light beam and a second split light beam;
an imaging spectrograph configured to receive the first split light beam and disperse a range of wavelengths of the first split light beam to form the spectral image, wherein the spectral image comprises a plurality of spectra;
the spatial image camera configured to receive the second split light beam; and
the spectral image camera configured to receive the spectral image from the imaging spectrograph,
wherein the spectral image camera and the spatial image camera are configured to synchronously record, respectively, the spectral image to generate a recorded spectral image of the spectral image and the spatial image to generate a recorded spatial image of the spatial image, wherein the recorded spectral image comprises multiple evenly-spaced optical spectra in a defined area of the image of the object that map to corresponding points in the recorded spatial image to enable the assignment of individual optical spectra of the recorded spectral image to physical features in the recorded spatial image, and wherein the spatial image is carried by the second split light beam.

18. The method of claim 17, wherein the images are of an object having inherent motion not directly under the control of the user of the spatial-spectral imaging apparatus.

19. The method of claim 17, further comprising:
associating a recorded spatial image recorded by the spatial image camera and a recorded spectral image synchronously recorded by the spectral image camera.

20. The method of claim 19, further comprising:
based on the association of the recorded spatial image and the recorded spectral image, mapping a spectrum of the plurality of spectra of the recorded spectral image to a point in the recorded spatial image.

21. The method of claim 17, wherein the object is a human fundus of a live human subject.

22. The method of claim 17, further comprising:
processing the recorded spectral image to compute an absorption spectrum for a patient; and
detecting, based on the absorption spectrum for the patient, an indication of Alzheimer's disease in the patient.

23. The method of claim 22, further comprising:
identifying, based on the recorded spatial image, locations of a feature within the object; and
mapping the locations to one or more spectra of the optical spectra of the recorded spectral image,
wherein processing the recorded spectral image to compute an absorption spectrum for a patient comprise computing the absorption spectrum of the one or more spectra of the optical spectra of the recorded spectral image.

24. The method of claim 23, wherein the feature comprises one of an optic disc, a retinal area, or a perifovea.

25. A spatial-spectral imaging apparatus comprising:
a beam splitter configured to receive a light beam carrying an image of an object and to split the light beam into a first split light beam and a second split light beam;
an imaging spectrograph configured to receive the first split light beam and disperse a range of wavelengths of the first split light beam to form a spectral image comprising a plurality of spectra;
a spatial image camera configured to receive the second split light beam; and
a spectral image camera configured to receive the spectral image from the imaging spectrograph,
wherein the spectral image camera and the spatial image camera are configured to synchronously record, respectively, the spectral image to generate a recorded spectral image of the spectral image and a spatial image carried by the second split light beam to generate a recorded spatial image of the spatial image, wherein the recorded spectral image comprises multiple evenly-spaced optical spectra along a first image dimension and a one-dimensional image of the object along a second image dimension that corresponds to a center horizon of the recorded spatial image to enable the assignment of individual optical spectra of the recorded spectral image to physical features in the recorded spatial image.

* * * * *

UNITED STATES PATENT AND TRADEMARK OFFICE
CERTIFICATE OF CORRECTION

PATENT NO. : 10,837,830 B2
APPLICATION NO. : 16/081806
DATED : November 17, 2020
INVENTOR(S) : Robert Vince, Swati Sudhakar More and James Melvin Beach It is certified that error appears in the above-identified patent and that said Letters Patent is hereby corrected as shown below:

On the Title Page

Item (22): Replace "PCT Filed: May 10, 2017" with --PCT Filed: March 10, 2017--

Signed and Sealed this
Twenty-third Day of July, 2024

*Katherine Kelly Vidal*

Katherine Kelly Vidal
*Director of the United States Patent and Trademark Office*